US008923524B2

(12) United States Patent
Wise et al.

(10) Patent No.: US 8,923,524 B2
(45) Date of Patent: Dec. 30, 2014

(54) ULTRA-COMPACT HEADSET

(75) Inventors: David E. Wise, San Diego, CA (US); Nikhil Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 13/342,090

(22) Filed: Jan. 1, 2012

(65) Prior Publication Data

US 2013/0170665 A1 Jul. 4, 2013

(51) Int. Cl.

*H04R 1/10* (2006.01)
*H02B 1/00* (2006.01)
*H04R 3/00* (2006.01)
*H04M 1/00* (2006.01)

(52) U.S. Cl.

USPC ........... 381/74; 381/122; 381/123; 455/569.1

(58) Field of Classification Search

CPC ............ H04R 3/00; H04R 5/02; H04R 25/00; H04R 5/033; H04R 5/04
USPC ............ 381/74, 71, 1, 71.6, 95, 96, 122, 123; 455/569.1
See application file for complete search history.

(56) References Cited

U.S. PATENT DOCUMENTS 5,694,467 A 12/1997 Young, III
7,072,476 B2 * 7/2006 White et al. .................... 381/74
7,616,760 B2 11/2009 Trip et al.
8,073,137 B2 * 12/2011 Weinans et al. .......... 379/433.06
2003/0073460 A1 4/2003 Van Pelt et al.
2008/0280654 A1 11/2008 Solomon
2010/0285750 A1 * 11/2010 Simonelic .................... 455/41.3
2011/0181452 A1 * 7/2011 Raifel et al. .................. 341/110

FOREIGN PATENT DOCUMENTS

EP 1855507 A2 11/2007
TW 200525986 8/2005
WO 0064216 A1 10/2000
WO WO0070779 A1 11/2000
WO WO2006028587 3/2006
WO 2008070005 A2 6/2008

OTHER PUBLICATIONS

International Search Report and Written Opinion—PCT/US2012/072343—ISA/EPO—Mar. 19, 2013.
Taiwan Search Report—TW102100068—TIPO—Jun. 10, 2014.

* cited by examiner

*Primary Examiner* — Paul S Kim
*Assistant Examiner* — David Ton

(57) ABSTRACT

An ultra-compact headset device including both speaker and microphone capability in at least one earphone overcomes the minimum size requirements of previous headsets by controlling the speaker and microphone functionality so that each earphone functions either as a speaker or microphone, but never both at the same time. Various embodiment headsets may include a pair of earphones each with one or more transducers capable of converting electrical signals into sound and vice versa. The ultra-compact headset may be wirelessly coupled to a mobile device, such as a cellular telephone or smart phone.

18 Claims, 9 Drawing Sheets

ULTRA-COMPACT HEADSET

BACKGROUND

Generally, a BlueTooth® wireless headset device includes a microphone, a loudspeaker, and a BlueTooth® wireless transmitter/receiver. The wireless headset device may receive data from a mobile communication device or other devices. The data is processed in order to generate an output as sound audible to a user. However, in such a device, the microphone must be located at least a minimum distance from the loudspeaker to prevent interference or feedback that may result in inoperability or poor operation of the wireless headset device. This minimum distance may be predetermined to avoid these problems, but the distance results in a fixed minimum size of the wireless headset device. Thus, typical Bluetooth® wireless headsets include small booms to position the microphone the minimum distance from the speakers. Such features and minimum size restrictions may render headsets undesirable or unattractive to some users.

SUMMARY

The various embodiments include methods, systems and devices that enable wireless headsets to be configured with a compact size by producing sound in one earphone and receiving sound in the other earphone when operating in a telephone or other mode. An embodiment headset may include a first earphone with an audio transducer configured to alternate between producing sound and receiving sound and a second earphone with an audio transducer configured to provide sound while operating in a telephone mode, with both earphones producing sound when operating in other modes. In some embodiments, the earphones may include an audio transducer configured to operate either to produce sound (i.e., as a speaker) or to receive sound (i.e. as a microphone), while in other embodiments the earphone may include both a sound producing transducer and a separate microphone positioned close to the transducer.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
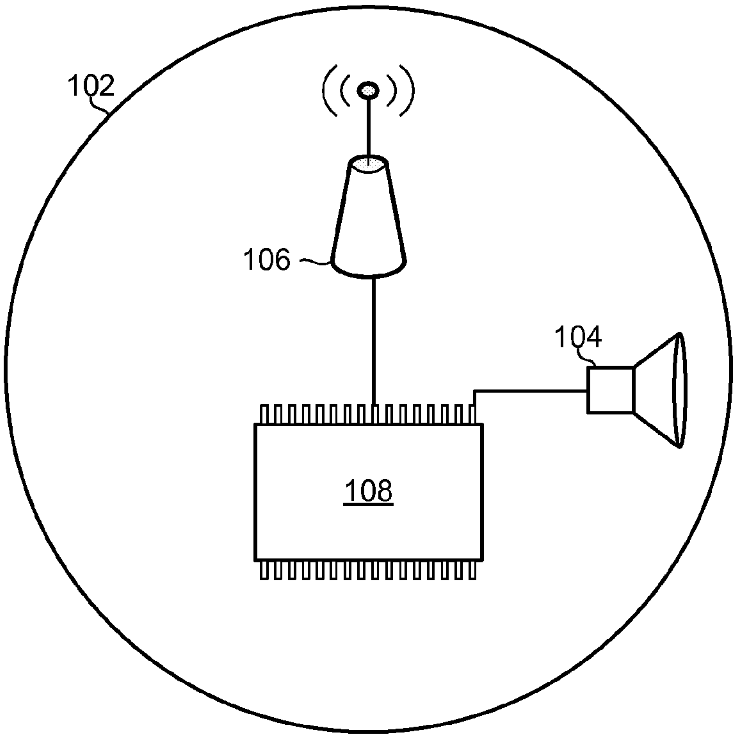
FIG. 1A is a system diagram of an ultra-compact earphone with one audio transducer configured to operate as either a speaker or a microphone.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word “exemplary” is used herein to mean “serving as an example, instance, or illustration.” Any implementation described herein as “exemplary” is not necessarily to be construed as preferred or advantageous over other implementations.

As used herein, the term “mobile device” may refer to any one or all of cellular telephones, personal data assistants (PDA’s), palm-top computers, wireless electronic mail receivers, multimedia Internet enabled cellular telephones, Global Positioning System (GPS) receivers, wireless gaming controllers, and similar personal electronic devices that include a programmable processor and memory and are configured to communicate with a wireless headset as described herein.

Generally users desire smaller sized devices that are powerful and operate flawlessly. The various embodiments provide an ultra-compact headset device that may overcome the minimum size requirements of previous headsets by switching between two or more modes of operation. Various embodiment headsets may include a pair of earphones each with one or more collocated transducers capable of converting electrical signals into sound and vice versa to function as a speaker and a microphone. In some embodiments one or both of the transducers may be operated either as a speaker or microphone so that a single earphone is never simultaneously receiving sound and generating sound at the same time, thereby preventing interference or feedback. In this manner, one earphone can function as a speaker while the other earphone functions as a microphone during a telephone call, VOIP call, video game, etc. In normal operation, both earphones function as a speaker, enabling the headset to produce stereo sound. The data signals carrying the stereo sound information provided by the mobile device may be communicated to the headset via a wireless data link, such as a Bluetooth® wireless link. A headphone functioning as a microphone during a telephone call, VOIP call, video game, etc. converts the received sound (e.g., the sound of the user’s voice) into digital signals, which are then transmitted to the mobile device via the wireless data link.

When connected to a mobile device functioning as a media player, the embodiment headsets may operate in a stereo mode, producing sound from both headphones within the headset. When the embodiment headset is used to make or receive telephone calls, conduct VOIP calls, play video games, etc., only one of the two earphones functions as a speaker while the other earphone functions as a microphone to capture the user’s voice. In embodiments with a microphone collocated with the speaker in each earphone, the second earphone's microphone may be used to capture the person's voice while the first earphone's speaker provides sound, with the second earphone's speaker and first earphone's microphone being deactivated during the call, VOIP call, video game, etc.

In this manner, the embodiments enable a wireless headset that is ultra small because crosstalk between collocated microphone and speaker is avoided by effectively placing the microphone in one ear and the speaker in the other ear. Since the active speaker and the active microphone are never in the same earphone, each earphone may be configured in an ultra-compact format by positioning the speaker and microphone close together, thereby avoiding the need for a microphone boom.

In the various embodiments, a wireless headset may comprise a pair of wireless earphones, each comprising a wireless transceiver. FIG. 1A illustrates an embodiment of an ultra-compact earphone 102 that may be used as one of two earphones in an embodiment compact headset. In this embodiment, the earphone 102 may include a processor 108 coupled to a wireless transceiver 106 and to a transducer 104. The wireless transceiver 106 may be configured to send and receive wireless communication signals of one or more known standards, such as Bluetooth®, DECT, and Wireless USB. The wireless transceiver 106 may be configured to establish a wireless data link with a wireless transceiver of a mobile device. The wireless transceiver 106 earphone 102 may also be configured to establish wireless data links with other types of wireless networks, such as a personal area network or local area network.

The wireless transceiver 106 may pass received data signals to the processor 108 which may be configured to translate such signals into signals which cause the transducer 104 to output audible sound. The type of processor 108 used in the various embodiments may be consistent with those well-known in the art of Bluetooth® headsets, but modified with executable instructions to perform operations described herein.

In the embodiment illustrated in FIG. 1A, the transducer 104 is capable of both transforming received sound into electrical signals that are processed by the processor 108, and transforming electrical signals from the processor 108 into audible sound. The audio transducer 104 may be configured to function as a speaker to generate sound based on signals received from the processor 108. Signals received by the wireless transceiver 106 may be processed by the processor 108 to generate the electrical signals provided to the transducer 104 to generate audible sound. The transducer 104 may be made using any known technology transducer, such as a piezoelectric crystal coupled to a membrane.

The audio transducer 104 may also be configured to function as a microphone. Sound received by the audio transducer 104 may be converted to electrical signals which are sent to the processor 108. These signals may be processed by the processor 108, such as using a codec in the processor 108, to generate data signals encoding the received sound, which in turn may be provided to the wireless transceiver 106 for transmission to another communication device, such as a cellular telephone via an established BlueTooth® wireless data link.

In this embodiment, the same transducer 104 can function as both a speaker and microphone because in telephone call mode, the transducer functions either as a speaker or microphone, but not both. This mode is referred to as a "telephone call mode" throughout this application for simplicity, but the various embodiments may be used for other types of communication that are similar to a telephone call using this mode. For example, the telephone call mode may allow the headset to be used for Voice over IP (VoIP) calling, communication during interactive gaming, video calling, voice-activated commands for interfacing with a computing device or music player, and various other computer audio interactions. For ease of reference, these additional uses of the various embodiments are referred collectively as a computer audio interaction. The descriptions of the various embodiments reference a telephone call mode are not intended to limit the claims unless specifically recited.

Figure 1B:
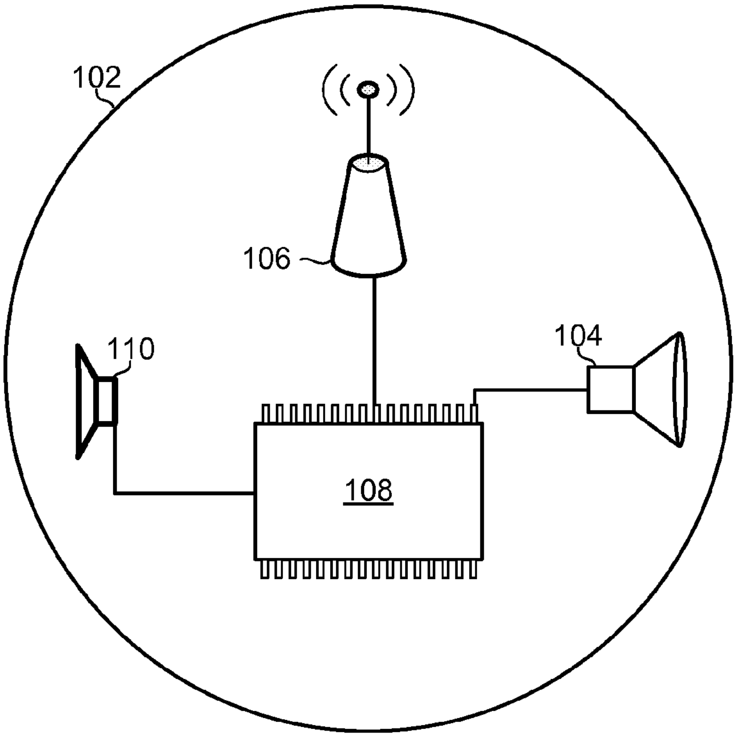
FIG. 1B is a system diagram of an ultra-compact earphone with an audio transducer and a microphone.

FIG. 1B illustrates an alternate embodiment configuration of an ultra-compact earphone 102 which includes a processor 108, a wireless transceiver 106, a sound producing transducer 104, and a microphone 110. The microphone 110 may be any known type of audio transducer capable of transforming received sound into electrical signals. In this embodiment, the speaker transducer 104 and microphone 110 can be positioned very close together in an ultra-compact earphone configuration, because in telephone call mode, either the speaker transducer 104 or the microphone 110 in any one earphone is activated, but not both. In this manner, crosstalk between the speaker transducer 104 and microphone 110 is avoided.

In an embodiment, one earphone of a headset is configured with both a microphone 110 and a speaker transducer 104 as illustrated in FIG. 1B. In this embodiment, when the headset functions in the telephone call mode, the earphone 102 that includes a microphone 110 is operated solely as a microphone, while the other earphone functions normally as a speaker.

In another embodiment, both earphones 102 in the headset include both a speaker transducer 104 and a microphone 110, so that either earphone may function as the microphone or as the speaker in telephone call mode. This embodiment may enable the user to select the earphone in which to receive sound. Also, in the event of a malfunction of either a speaker or microphone in one earphone, the roles of the two earphones can be switched so that the headset can continue to function in the telephone call mode.

Figure 1C:
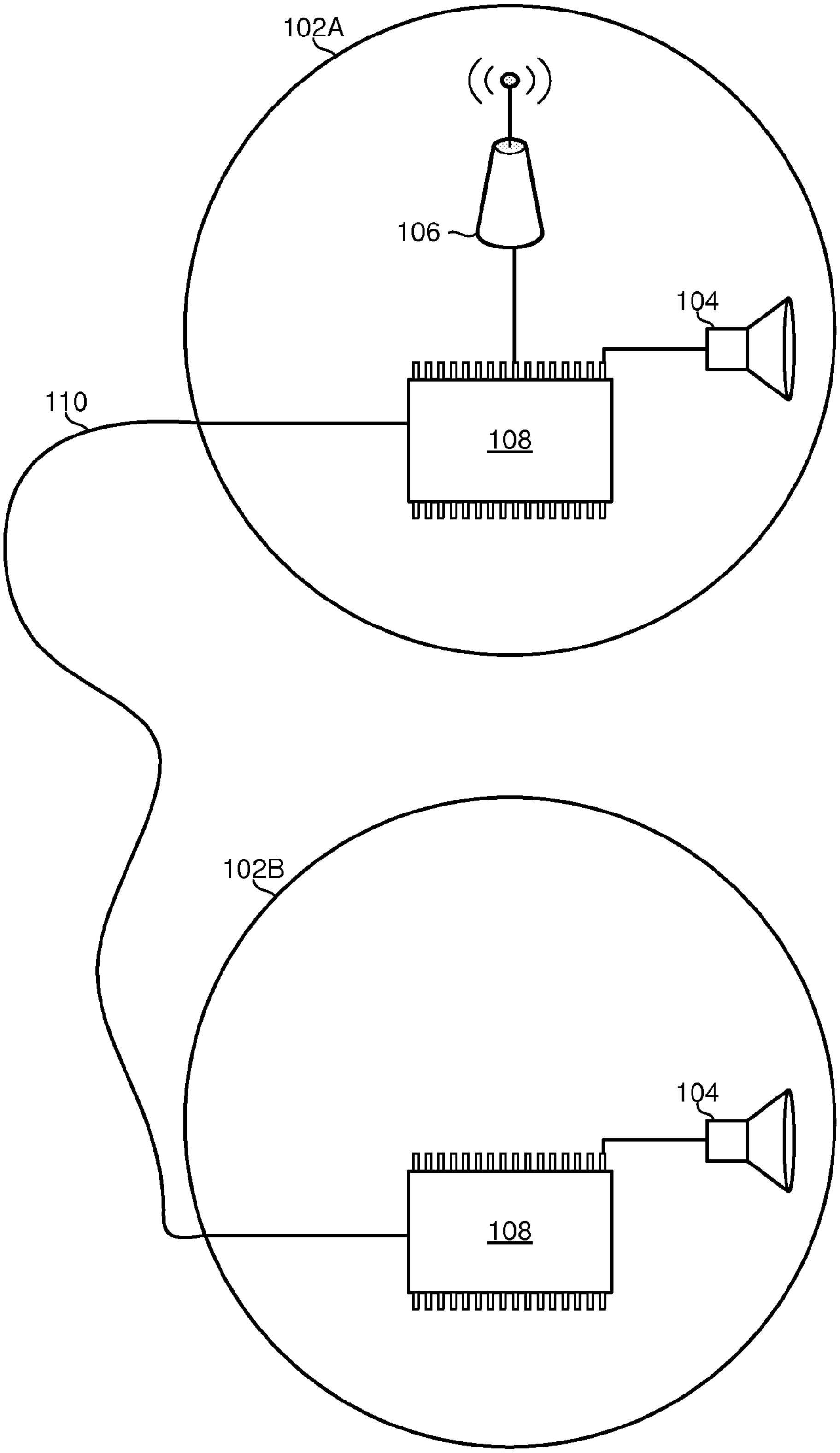
FIG. 1C is system diagram of a pair of ultra-compact earphones coupled together by a wire.

In a further embodiment, the two ultra-compact earphones may be coupled together via a wired connection instead of or in addition to a wireless data link. An example of such an embodiment is illustrated in FIG. 1C which shows two ultra-compact earphones 102A, 102B with their respective processors 108 coupled together by a wire or data cable 110. In such an embodiment, one of the ultra-compact earphones (a "first earphone") 102A may be configured to establish a wireless data link with a wireless transceiver of a mobile device, while the other ultra-compact earphone (a "second earphone") 102B is configured to receive signals from and send signals to the mobile device via the first earphone. In further embodiments, one or both earphones may be connected to various other devices by a wire or cable (not shown).

Figure 2A:
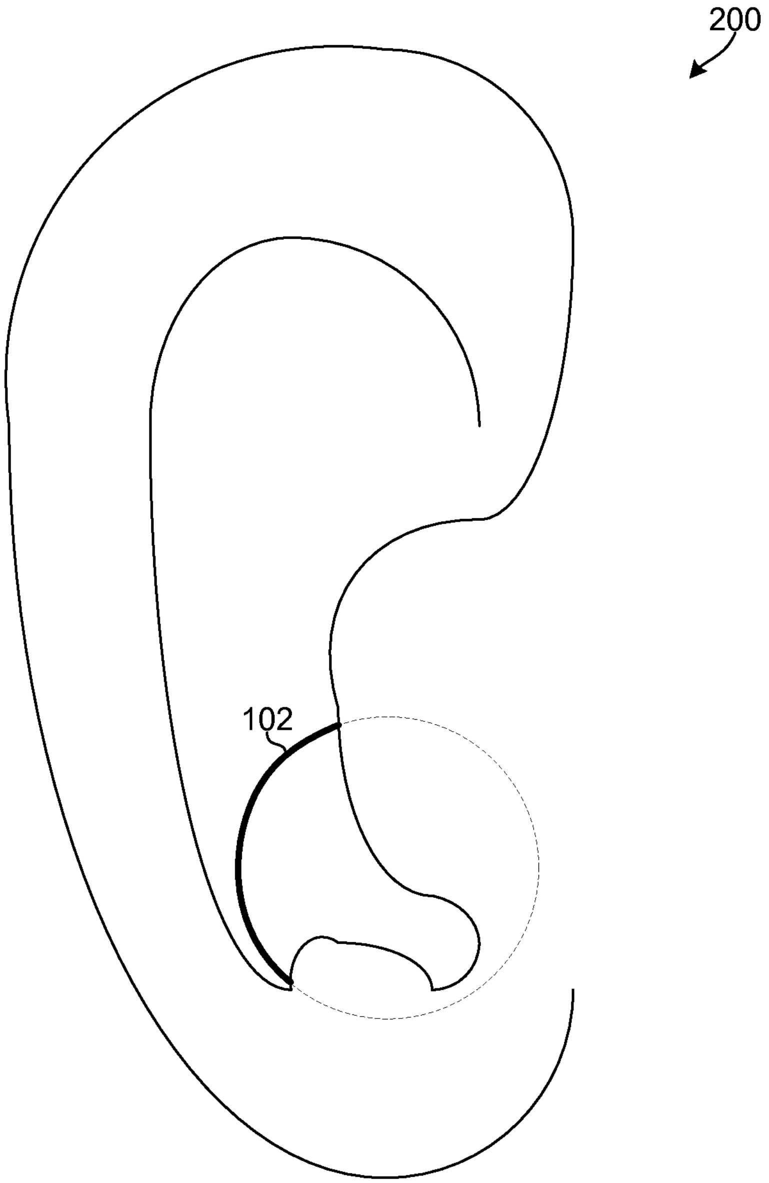
FIG. 2A is an illustration of a possible placement of an ultra-compact earphone in an ear.
Figure 2B:
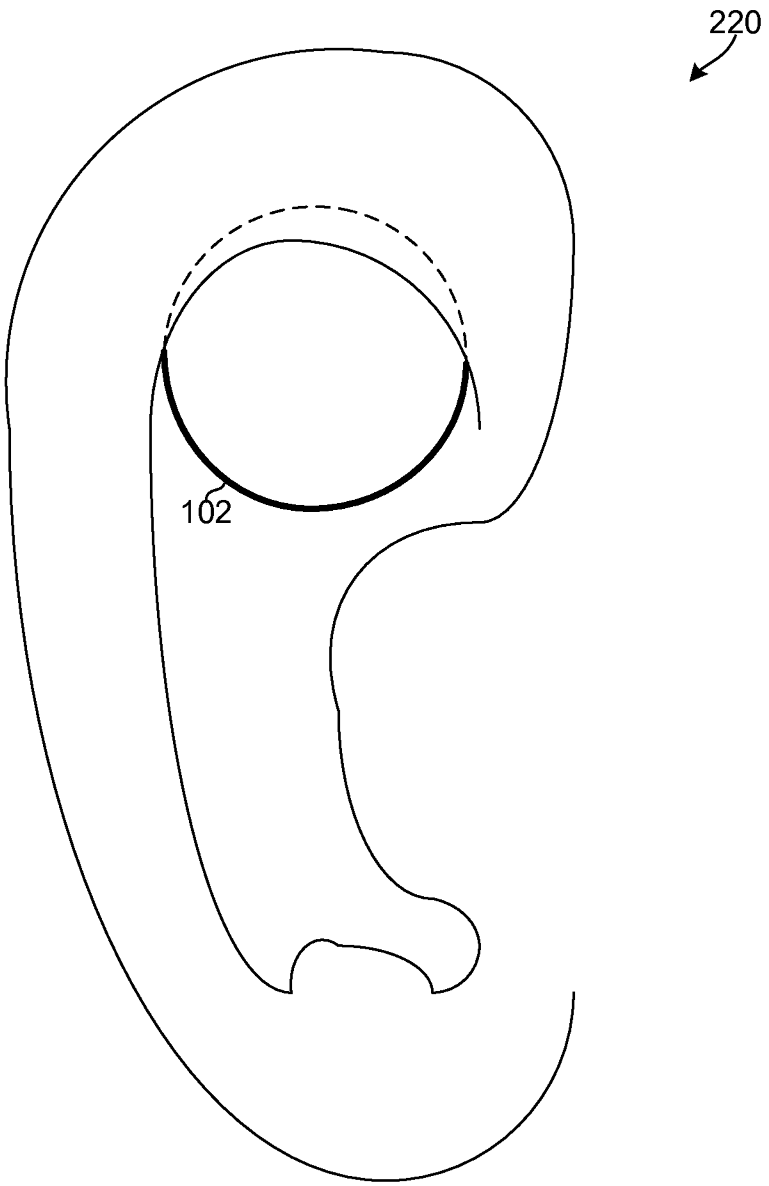
FIG. 2B is an illustration of an alternate placement of an ultra-compact earphone in an ear.

A compact earphone 102 may be positioned in various locations in, on, or near the ear of a user, similar to conventional headphones or earphones. FIG. 2A illustrates an exemplary position 200 for placing an ultra-compact earphone 102 within an ear. A compact earphone 102 may be located within the pinna, such as tucked behind the tragus and antitragus as shown in the exemplary position 200. Alternate embodiments may enable placing the headset in various other places in the pinna or nearby. For example, FIG. 2B illustrates another exemplary position 220 in which the compact earphone 102 is placed higher in the ear.

Figure 3:
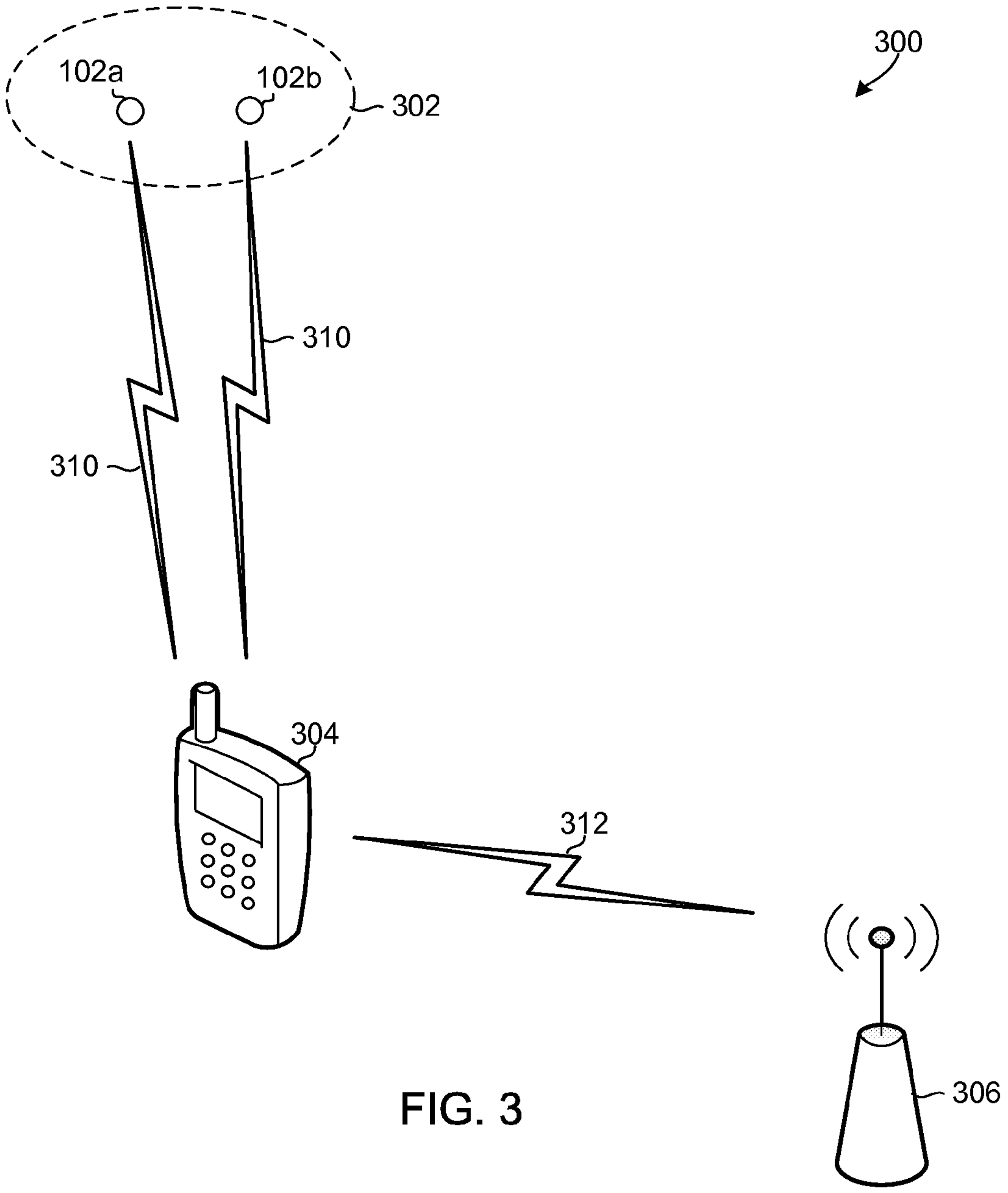
FIG. 3 is a communication system diagram illustrating components in communication with a compact headset for use with various embodiments.

FIG. 3 illustrates an exemplary communication system 300 including an embodiment ultra-compact headset 302. The ultra-compact headset 302 may comprise a set of two compact earphones 102*a* and 102*b* as described above with reference to FIGS. 1A and 1B. The earphones 102*a*, 102*b* may be positioned in an ear of a user, such as the positions shown in FIG. 2A or 2B. The earphones 102*a*, 102*b* may be configured as described above with reference to FIG. 1A or 1B.

The wireless transceivers 106 within each earphone 102*a*, 102*b* may establish one or two wireless data links 310 with a mobile device 304, such as a cellular telephone or smart phone. The mobile device 304 may establish a wireless data link connection 312, such as a cellular telephone call, with a network station 306, such as a cellular network base station. The mobile device 304 may receive telephone service, access to local networks or the Internet, radio, or various other services from one or more network stations 306.

The headset 302 generates sound based on signals received from the mobile device 304 via the wireless data links 310. In the stereo mode, the headset 302 may play stereophonic sound when receiving music signals from the mobile device 304. As described above, when a telephone call is received or initiated by a user of the mobile device, the headset 302 may switch to the telephone call mode in which one earphone 102*a* generates sound and the other earphone 102*b* receives sound.

Figure 4A:
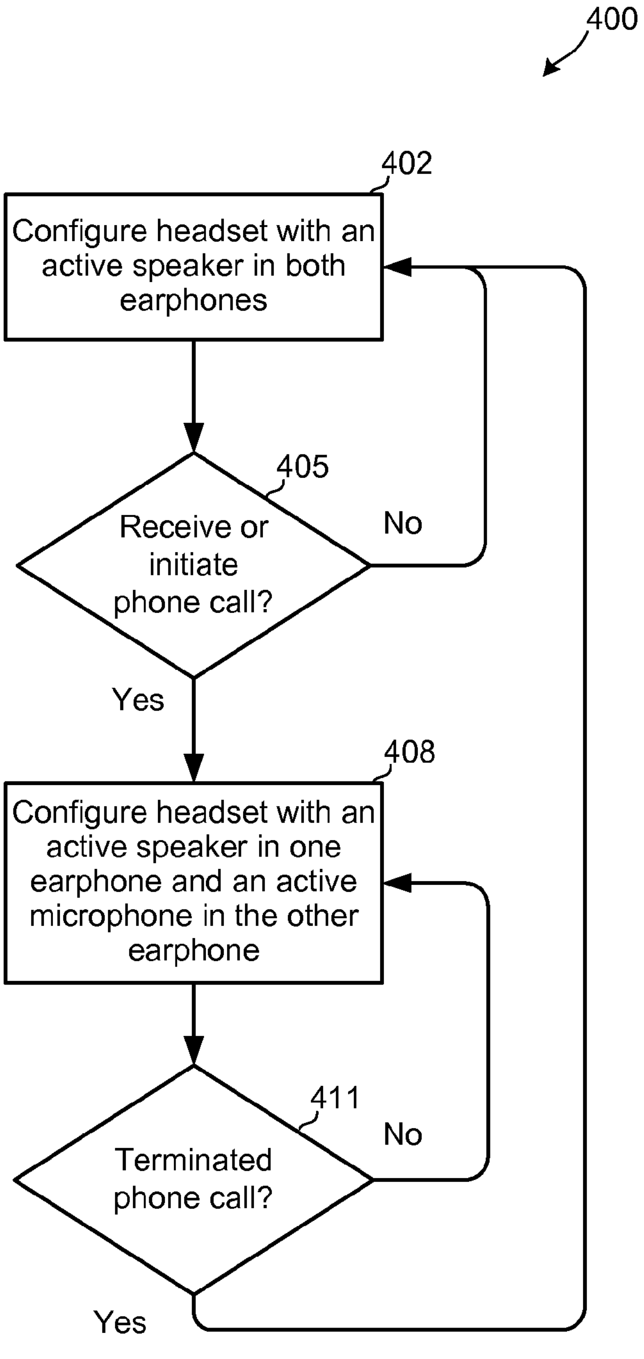
FIG. 4A is a process flow diagram of an embodiment method for configuring a compact headset to produce stereo sound in normal operation and produce sound in one headphone and receive sound in the other headphone in a telephone call mode.

FIG. 4A illustrates an embodiment method 400 for selecting headset operating modes. The headset 302 may be configured to operate with both earphones 102*a*, 102*b* functioning as speakers in a normal operating mode, step 402. With both earphones speakers active, the headset 302 may generate stereophonic sound for a user, such as music received from the mobile device 304. In determination step 405, the headset or the mobile device may determine whether a telephone call is initiated, such as by the mobile device 304 receiving an incoming call or the user dialing an outgoing a telephone call. So long as a telephone call is not received or initiated (i.e., determination step 405=No), the headset 302 may remain in the stereo mode of step 402. When a call is received or initiated by the user (i.e., determination step 405=Yes), the headset 302 may be configured to operate with an active speaker 104 in one earphone 102*a* and an active microphone in the other earphone 102*b* in step 408. As discussed above, in the various embodiments, an earphone operating as a microphone may receive sound through the same transducer 104 that generates sound in a normal mode or through a separate microphone 110. In the telephone call mode, the wireless transceiver 106 of the earphone 102*a* configured to operate with the active speaker 104 may receive sound signals from the mobile device 304 via a wireless data link 310 and generate audible sounds of the phone call. Simultaneously, the earphone 102*b* configured to operate as a microphone receives sounds of the user's voice, encodes the sound into data signals and transmits those sound signals via the same or a different wireless data link 310 to the mobile device 304. The headset 302 may operate in this telephone call mode so long as the call remains in progress. Because the active speaker 104 and the active microphone 110 are in separate earphones 102, the headset 302 will not experience feedback and interference problems.

The headset 302 and/or mobile device 304 may monitor the telephone call to detect when it is terminated in determination step 411. So long as the telephone call is not terminated (i.e., determination step 411=No), the headset 302 may remain in the telephone mode of step 408, with one earphone functioning as a speaker and the other earphone functioning as a microphone. When the telephone call is terminated (i.e., determination step 411=Yes), the headset 302 may be reconfigured to the stereo mode of step 402, with both earphones functioning as speakers. A headset 302 returning to the stereo mode of step 402 may automatically resume providing stereophonic sound.

Figure 4B:
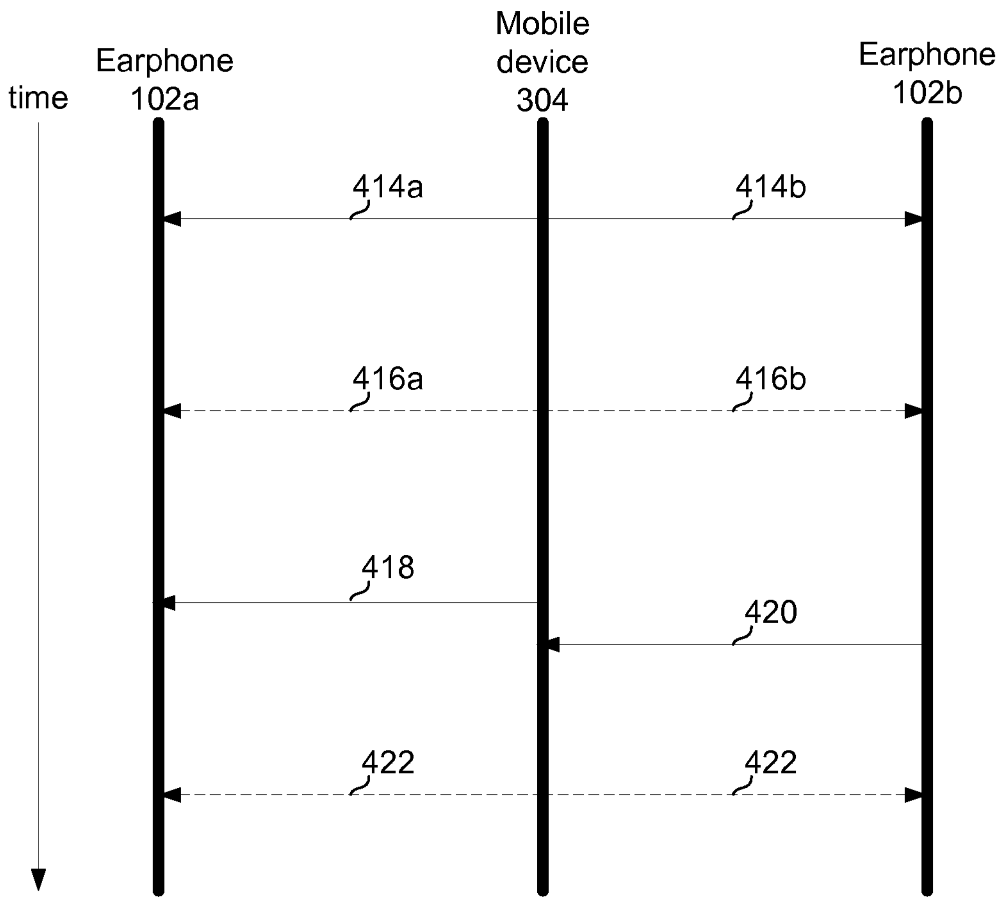
FIG. 4B is a communication flow diagram of an embodiment operating in a telephone call mode.

FIG. 4B illustrates communication signals passing between the mobile device 304 and each of the compact earphones 102*a*, 102*b* of a headset 302. If the headset 302 is in a stereo mode, the mobile device 304 may transmit stereo audio data 414*a* and 414*b* to both compact earphones 102*a* and 102*b*. One channel of the stereo audio data 414*a* is provided to one earphone 102*a* and the other channel of the stereo audio data 414*b* is provided to the other earphone 102*b*. When a telephone call is received or initiated, the mobile device 304 may transmit an incoming call signal 416*a*, 416*b* to each of the compact earphones 102*a* and 102*b* in order to reconfigure their operating modes. The headset 302 may be configured to reconfigure itself into the telephone call mode based on the incoming call signal 416*a*, 416*b*. Alternatively, the mobile device 304 may be configured to identify to each earphone 102*a*, 102*b* the speaker or microphone role that each earphone is to perform. For example, in message 416*a*, the mobile device 304 may instruct the first earphone 102*a* to function as a speaker, while message 416*b* instruct the second earphone 102*b* to activate or function as a microphone. The mobile device may transmit phone call audio data 418 to the earphone 102*a* functioning as a speaker, and receive user voice data signals 420 from the earphone 102*b* configured to function as a microphone. At the end of the telephone call, the mobile device 304 may transmit a call termination signal 422 to both of the compact earphones 102*a* and 102*b*. In response to the call termination signal 422, the headset 302 may be configured to reconfigure itself into the stereo mode. Alternatively, the call termination signal 422 may be sent only to the earphone 102*b* configured as a microphone to directed it to begin functioning as a speaker.

In various embodiments, a compact headset 302 may automatically switch between modes based on a triggering condition. Examples of triggering conditions include whether user speech is present, which may be determined by voice recognition software, or whether some form of user input is received, such as pushing a button on the mobile device 304.

Figure 4C:
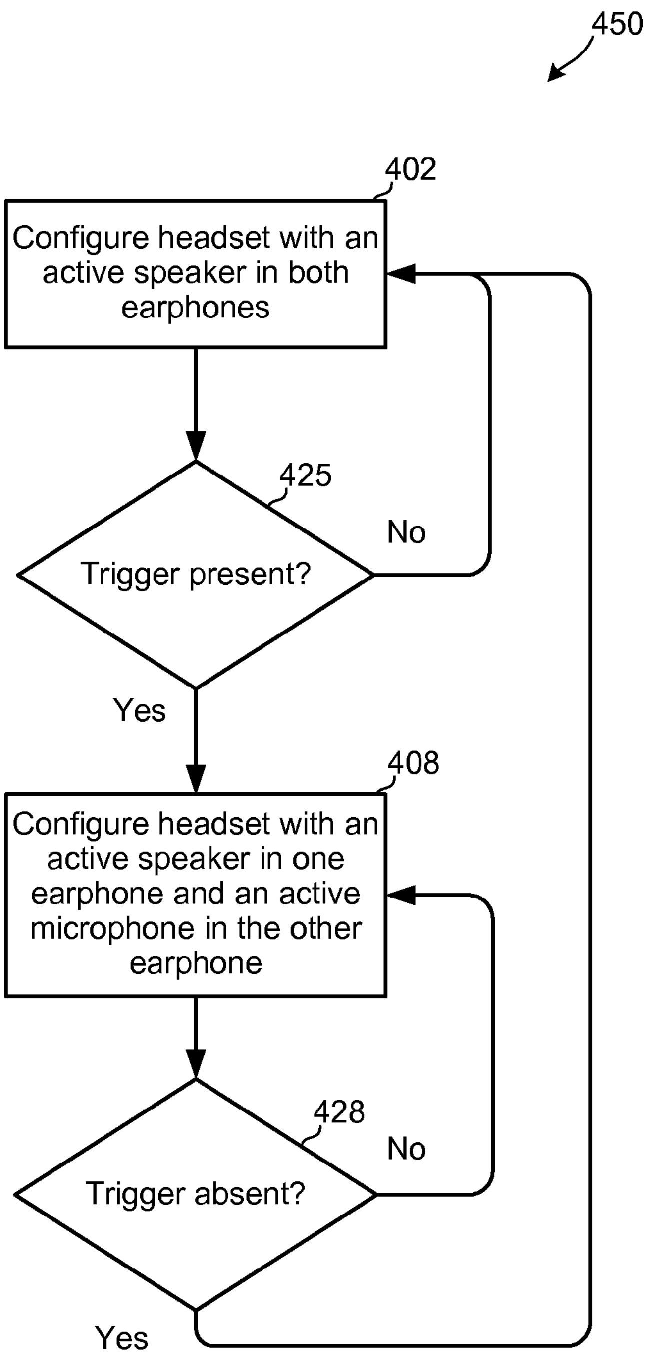
FIG. 4C is a process flow diagram of another embodiment method for configuring a compact headset to produce stereo sound in normal operation and produce sound in one headphone and receive sound in the other headphone in a telephone call mode.

FIG. 4C illustrates an embodiment method 450 for selecting the appropriate headset mode based on triggering conditions. The headset 302 may be configured to function as active speakers in both earphones 102*a*, 102*b* in step 402. The headset and/or the mobile device 304 may monitor a triggering condition to determine whether a triggering condition is present in determination step 425. So long as a triggering condition is not present (i.e., determination step 425=No), the headset 302 may remain in the stereo mode of step 402. When a triggering condition is detected (i.e., determination step 425=Yes), the headset 302 may be reconfigured to operate with an active speaker 104 in one earphone 102*a* and an active microphone in the other earphone 102*b* in step 408. While in the telephone mode, the earphones may function as described above, with one earphone functioning as a microphone and the other earphone functioning as a speaker.

The headset 302 and/or mobile device 304 may monitor whether the triggering condition is no longer present in determination step 428. So long as the triggering condition is met or present (i.e., determination step 428=No), the headset 302 may remain in the telephone call mode of step 408. When the triggering condition is no longer met or present (i.e., determination step 428=Yes), the headset 302 may be reconfigured into the stereo mode in step 402. A headset 302 returning to the stereo mode of step 402 may automatically resume providing stereophonic sound.

The embodiment illustrated in FIG. 4C provides a number of advantages. For one, the ability of changing between speaker and microphone modes based on a triggering condition in method 450 enables operations in which a user may listen to telephone calls in stereo. The headset 302 may generate stereo sound during phone calls until a microphone in one or both of the headphones receives sound that the headset or the mobile device recognizes as the users voice, which would be a triggering condition that causes one of the headphones to switch to the microphone role. So long as the user continues to speak, the headphones may continue function in the telephone call mode, with one functioning as a microphone and the other functioning as a speaker. When the user stops speaking, the triggering condition of the user's voice will no longer be present, so the earphones may switch back to the stereo mode. In this manner, both earphones may generate sound while the user is not speaking, but the same earphone is never simultaneously generating sound while functioning as a microphone, thereby avoiding problems of feedback and interference.

In various embodiments, the earphones 102*a*, 102*b* may alternate roles. For example, rather than the headset 302 switching modes by a single earphone 102*a* alternating between an active microphone 110 and an active speaker 104 while the second earphone 102*b* constantly has an active speaker 104, the earphones 102*a*, 102*b* may alternate which earphone has the active microphone 110 and which has the active speaker 104. In an embodiment, the two earphones 102*a*, 102*b* may alternate these roles quickly. Neither earphone may generate and receive sound at the same time, thereby avoiding operability problems from collocating a speaker 104 and a microphone 110. However, by alternating roles rapidly the earphones 102*a*, 102*b* may give the user the illusion of stereo sound. In some embodiments, providing and receiving sound in each headset may be slightly out of phase to compensate for the time of travel for sound between each transducer. This phase difference may create a small overlap of sending and receiving sound in the same headset while still avoiding interference and feedback problems.

In the various embodiments, the microphone within an earphone may be any known type of microphone, including for example, conventional microphones, a piezoelectric microphone/speaker, and a condenser microphone. In the various embodiments, the speaker within each earphone may be any known type of speaker, including for example, an analog speaker, piezoelectric speaker, a piezoelectric speaker/microphone, and a digital speaker.

While the foregoing descriptions referred to the operating mode in which one earphone functions as a speaker and the other earphone functions as a microphone as the "telephone call mode," the embodiments are not limited to using this operating mode for telephone calls. For example, the same operating mode may be implemented for dictation, walkie-talkie, voice operated commands, VoIP calls, video conferencing, gaming, and other applications in which a user's voice is to be sensed or recorded.

Figure 5:
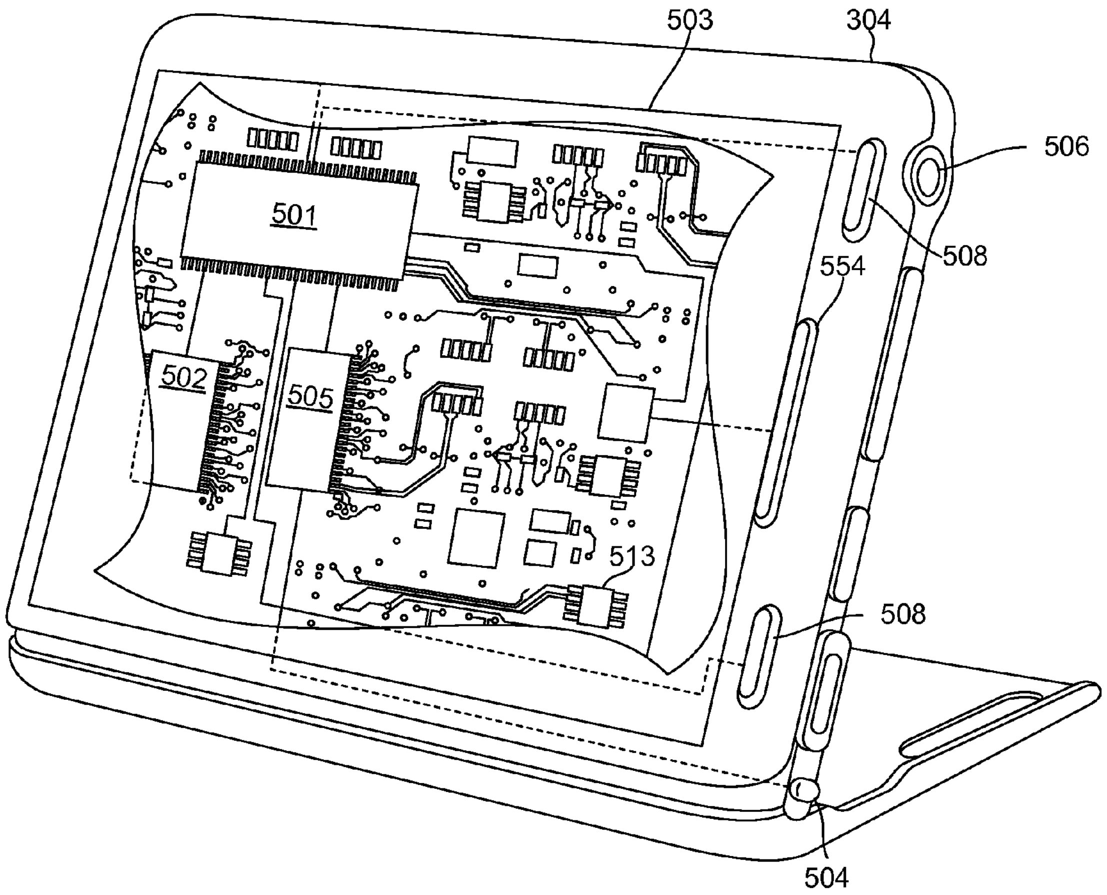
FIG. 5 is a component block diagram of a mobile computing device suitable for use with the various embodiments.

FIG. 5 is a system block diagram of a mobile device suitable for use with any of the embodiments. A typical mobile device 304 may include a processor 501 coupled to internal memory 502, a display 503, and to a speaker 554. Additionally, the mobile device 304 may include an antenna 504 for sending and receiving electromagnetic radiation that may be connected to a wireless data link and/or cellular telephone transceiver 505 coupled to the processor 501. The mobile device 304 may include a transceiver 506 coupled to the processor 501 and used to communicate with a headset 302. Mobile devices 304 typically also include menu selection buttons or rocker switches 508 for receiving user inputs.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a non-transitory computer-readable medium. Non-transitory computer-readable media includes both computer storage media and communication media including any medium that facilitates transfer of a computer program from one place to another. A non-transitory storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory machine readable medium and/or non-transitory computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A headset, comprising:
- a first earphone comprising:
  - a first microphone;
  - a first speaker positioned in close proximity to the first microphone within the first earphone; and
  - a first wireless transceiver configured to communicate with other devices via a wireless data link, output sound signals to the first speaker, and receive sound signals from the first microphone; and
- a second earphone comprising:
  - a second speaker;
  - a second microphone positioned in close proximity to the second speaker; and
  - a second transceiver configured to communicate with other devices via a wireless data link and output sound signals to the second speaker,
- wherein:
  - the first earphone is configured such that the first microphone and the first speaker are not simultaneously active; and
  - the first earphone and the second earphone are configured to activate each of the first speaker and the second microphone and each of the second speaker and the first microphone alternatively to simulate stereophonic sound.

2. The headset of claim 1, wherein the first wireless transceiver and the second wireless transceiver are BlueTooth® transceivers.

3. The headset of claim 1, wherein the first speaker and the first microphone are substantially the same structure configured to operate either as a speaker or a microphone.

4. The headset of claim 1, wherein the first microphone is configured to be active and the first speaker is configured to be inactive during a telephone call.

5. The headset of claim 1, wherein the first microphone is configured to be active and the first speaker is configured to be inactive during a computer audio interaction.

6. The headset of claim 1, wherein the first microphone is configured to be active and the first speaker is configured to be inactive based on a triggering condition.

7. The headset of claim 1, wherein the second earphone is configured such that the second microphone and the second speaker are not simultaneously active.

8. The headset of claim 1, wherein the first earphone and the second earphone are connected by a wire, and the second transceiver in the second earphone is configured to communicate with other devices via the wireless data link established by the first wireless transceiver in the first earphone.

9. A method of using a headset comprising a first earphone and a second earphone in which the first earphone comprises a first speaker and a first microphone positioned in close proximity to the first speaker and the second earphone comprises a second speaker and a second microphone positioned in close proximity to the second speaker, comprising activating each of the first speaker and the second microphone and each of the second speaker and the first microphone alternatively to simulate stereophonic sound.

10. A headset comprising a first earphone that comprises a first speaker and a first microphone positioned in close proximity to the first speaker and a second earphone that comprises a second microphone and a second speaker positioned in close proximity to the second speaker, comprising means for activating each of the first speaker and the second microphone and each of the second speaker and the first microphone alternatively to simulate stereophonic sound.

11. A system, comprising:
- a mobile device comprising a wireless transceiver;
- a first earphone comprising:
  - a first microphone;
  - a first speaker positioned in close proximity to the first microphone within the first earphone; and
  - a first wireless transceiver configured to communicate with the mobile device via a wireless data link, output sound signals to the first speaker, receive sound signals from the first microphone, and communicate received sound signals to the mobile device via the wireless data link; and
- a second earphone comprising:
  - a second speaker;
  - a second microphone positioned in close proximity to the second speaker; and
  - a second transceiver configured to communicate with the mobile device via a wireless data link and output sound signals to the second speaker,
- wherein:
  - the first earphone is configured such that the first microphone and the first speaker are not simultaneously active; and
  - the first earphone and the second earphone are configured to activate each of the first speaker and the second microphone and each of the second speaker and the first microphone alternatively to simulate stereophonic sound.

12. The system of claim 11, wherein the first wireless transceiver and the second wireless transceiver are BlueTooth® transceivers.

13. The system of claim 11, wherein the first speaker and the first microphone are substantially the same structure.

14. The system of claim 11, wherein the mobile device is a telephone, and the first microphone is configured to be active and the first speaker is configured to be inactive during a telephone call maintained by the mobile device.

15. The system of claim 11, wherein the mobile device is configured to support computer audio interactions, and the first microphone is configured to be active and the first speaker is configured to be inactive during a computer audio interaction.

16. The system of claim 11, wherein the first microphone is configured to be active and the first speaker is configured to be inactive based on a triggering condition.

17. The system of claim 11, wherein the second earphone is configured such that the second microphone and the second speaker are not simultaneously active.

18. The system of claim 11, wherein the first earphone and the second earphone are connected by a wire, and the second transceiver in the second earphone is configured to communicate with other devices via the wireless data link established by the first wireless transceiver in the first earphone.

* * * * *